Dec. 30, 1930.  J. HALBERSTADTER  1,786,994
FLOWERPOT STAND
Filed June 22, 1927
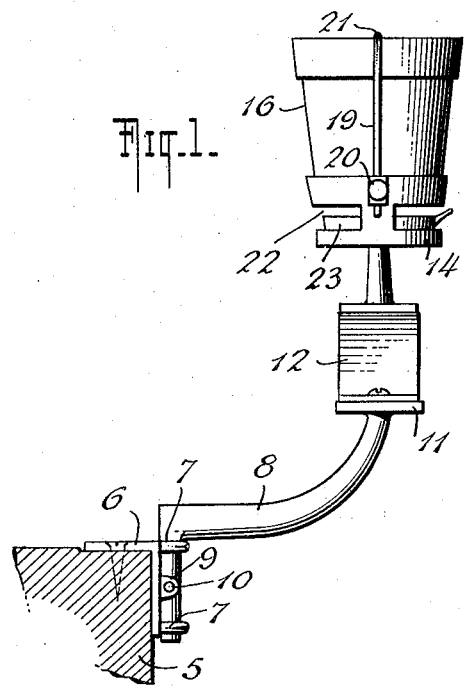
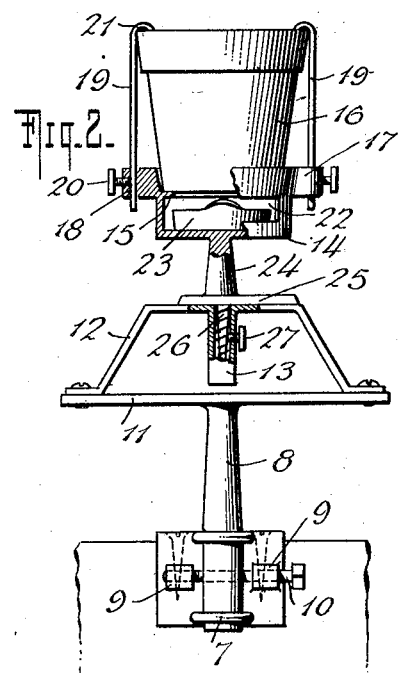
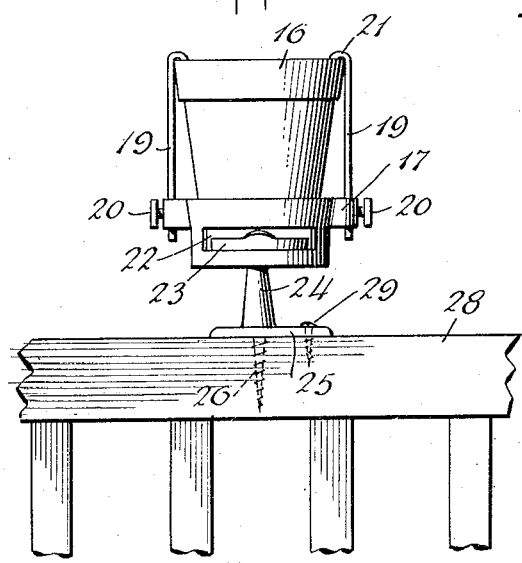
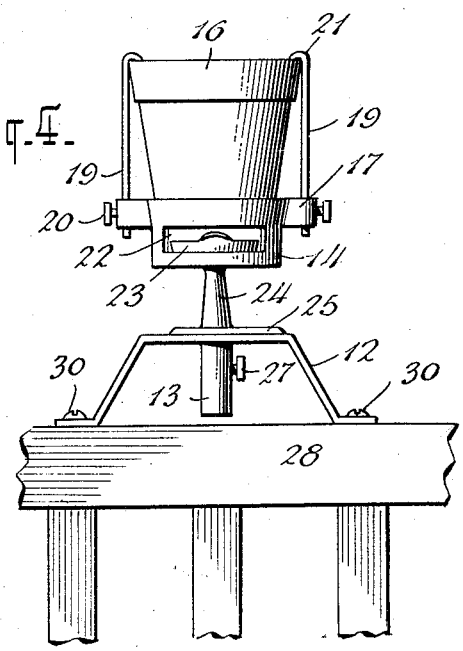
INVENTOR
JUDA HALBERSTADTER
BY *Richards Geier*
ATTORNEYS Patented Dec. 30, 1930

1,786,994

UNITED STATES PATENT OFFICE

JUDA HALBERSTADTER, OF ELIZABETH, NEW JERSEY

FLOWERPOT STAND

Application filed June 22, 1927. Serial No. 200,547.

This invention relates to improvements in flower pot stands, and has for one of its objects to provide a stand of simple and inexpensive construction in which a flower pot may be securely retained in position and which may be mounted upon a window sill, fence or other like place so as to effectively display the flowers in said pot.

Another object is to provide the stand with a holder and a supporting bracket adapted to be secured to a window sill or the like and arranged to permit of said holder being adjusted to various positions relative to said sill.

The above and other objects will appear more clearly from the following detail description, when taken in connection with the accompanying drawing, which illustrates a preferred embodiment of the invention idea.

In the drawing—

Figure 1 is a side elevation of the stand constructed in accordance with the invention and showing the bracket thereof attached to a window sill or like support;

Figure 2 is a front elevation, partly broken away and shown in section;

Figure 3 is a front elevation showing the holder mounted upon a fence or like structure; and Figure 4 is a similar view but with a portion of the bracket attached to the holder and utilized for connecting the same to the fence.

Referring more particularly to Figures 1 and 2, the numeral 5 indicates a window sill or like structure to which is attached the angular plate 6 of a supporting bracket having vertically aligned bearings in the form of rings 7 on one portion of the plate adapted to receive the lower extremity of a supporting arm 8, said lower extremity being rotatable in the bearings 7 to permit of the arm being swung to various positions relative to the window sill. In order that the arm 8 may be rigidly held in a position extending outwardly from the sill, the plate 6 is provided with bosses 9 arranged on opposite sides of the bearings 7 and said bearings are provided with opposed openings adapted to align with an opening formed in the lower extremity of the arm 8 mounted in said bearings so that a locking bolt or pin 10 may be extended through the bosses 9 and said aligned openings with a threaded end of the bolt engaged with one of the bosses. In this manner the arm 8 is locked in position and its lower extremity is prevented from rotating in the bearings.

The flower pot holder forming a part of the present invention comprises a body 14 made of any suitable material and constituting a receptacle which is provided interiorly thereof and intermediate its top and bottom with an inwardly directed flange 15 forming a shelf or support upon which is rested the bottom of the flower pot 16. On diametrically opposite sides of the body 14 the same is provided with enlargements or bosses 17 having openings 18 therein for receiving the lower ends of clamping members 19 secured in said openings by means of set screws or other suitable fastening devices 20. The upper end of each clamping member is provided with a hook 21 adapted to engage over the upper edge of the pot 16, so that when the clamping members 19 are secured in position the pot will be rigidly held on the holder. The portion of the body 14 below the flange 15 therein is provided with an opening 22 therethrough into which may be inserted a drip pan 23 for catching the water that seeps through the bottom of the flower pot. The bottom of the body 14 has a standard 24 depending therefrom which terminates in its lower end in a transverse plate 25 designed to rest upon the intermediate portion of the angular support 12 and said plate has depending therefrom a screw 26 which is adapted to engage in the socket portion 13 when the flower pot holder is mounted upon the bracket. A set screw 27 in said socket portion is engageable with the screw to fasten the holder in position on the support 12.

If it is desired to mount the holder upon a fence or other like structure 28, this may be done in two ways. In Figure 3, the holder is shown detached from the support 12 and the screw 26 threaded into the top rail of the fence with the plate 25 engaging said rail. Another screw 29 may be extended through the plate 25 and engaged with said rail in order to prevent any possibility of the holder being turned with respect to the rail after being properly positioned thereon.

In Figure 4, the holder is shown still attached to the support 12, which has been detached from the plate 11, and its extremities rested upon the top rail of the fence and secured thereto by suitable fasteners 30.

What is claimed is:

1. A flower pot stand including a holder, a bracket for supporting said holder including a plate adapted to be secured to a window sill or other support and having bearings, an arm having one end rotatably mounted in said bearings, bosses formed on said plate on opposite sides of said bearings, a bolt extending through said bosses, said bearings and the extremity of said arm mounted therein to lock said arm in an adjusted position, the other end of said arm terminating in a plate, and an angular support carried by said plate and having an intermediate portion spaced therefrom and provided with a socket for receiving a portion of said holder.

2. A flower pot stand including a holder, a bracket for supporting said holder including a plate adapted to be secured to a window sill or other support and having bearings, an arm having one end rotatably mounted in said bearings, the other end of said arm terminating in a flat plate, and an angular support having its ends secured to said plate and an intermediate portion above said plate in spaced relation thereto, said intermediate portion being provided with a socket depending therefrom between the same and said flat plate, said socket receiving a portion of said holder.

3. A flower pot stand including a holder, a bracket for supporting said holder including a plate adapted to be secured to a window sill or other support and having a bearing for receiving a supporting arm for said holder, bosses formed on said plate on opposite sides of said bearing, and a bolt extending through said bosses and said bearing and engageable with the arm in the latter to lock said arm in said bearing.

In testimony whereof I have affixed my signature.

JUDA HALBERSTADTER.